United States Patent [19]

Fricano et al.

[11] Patent Number: 4,737,390

[45] Date of Patent: Apr. 12, 1988

[54] NON-SLIP COATING FOR MOLDED ARTICLES

[75] Inventors: Patricia A. Fricano, West Allis; Howard P. Cordts, Grafton, both of Wis.

[73] Assignee: Freeman Chemical Corporation, Port Washington, Wis.

[21] Appl. No.: 808,002

[22] Filed: Dec. 12, 1985

[51] Int. Cl.⁴ .................. B32B 31/20; B63B 5/24; B65D 1/34; B65D 6/04

[52] U.S. Cl. ....................................... 428/35; 114/85; 156/224; 156/245; 156/307.1; 156/307.3; 156/309.6; 264/136; 264/137; 264/257; 264/258; 264/324; 206/557; 428/175; 428/177; 428/251; 428/252; 428/285; 428/286; 428/287; 428/543

[58] Field of Search ............... 264/136, 137, 257, 258, 264/324; 156/245, 307.1, 307.3, 224, 309.6; 206/557; 428/35, 175, 177, 251, 252, 285, 286, 287; 114/85

[56] References Cited

U.S. PATENT DOCUMENTS

| | | | |
|---|---|---|---|
| 2,777,626 | 1/1957 | French | 428/455 |
| 4,145,240 | 3/1979 | Polzin | 156/246 |
| 4,654,099 | 3/1987 | Sandman | 156/224 |

Primary Examiner—James C. Cannon
Attorney, Agent, or Firm—John C. Cooper, III; Fred Wiviott

[57] ABSTRACT

Non-slip properties are imparted to molded plastic articles by adhering a layer of latex or a latex-impregnated sheet material onto the surface of the molded article. Preferably, the latex layer is applied prior to thermoset curing of the molded article and is adhered to the thermoset article during the curing process. The plastic may be reinforced, and the latex is preferably an acrylic latex impregnated into a sheet material such as cloth or paper.

13 Claims, 1 Drawing Sheet

NON-SLIP COATING FOR MOLDED ARTICLES

BACKGROUND OF THE INVENTION

1. Field of the Invention

The present invention relates generally to the art of non-slip coatings, and more particularly to non-slip coatings for molded articles, such as trays. Still more particularly, the present invention relates to providing permanent non-slip coatings during the molding process for the article to be produced.

2. Description of the Prior Art

Non-slip coatings have been known for many years for a variety of finished industrial and consumer products. For example, articles can be painted with a finish coat which may include abrasive materials, such as silica, sand or other granular materials. These granular materials, along with the resin binder, provide a rough surface which provides some non-slip characteristics. It is also known that non-slip materials such as rubber mats, cork sheets or other materials can be laminated to the object to which non-slip characteristics are to be added.

Non-slip properties for molded articles are desirable for many different applications. One typical application is trays, such as those trays used in restaurants, cafeterias, cocktail lounges, etc. Such trays are usually made by molding a fiberglass reinforced plastic and finishing by sanding and other conventional techniques. Such trays are usually quite slick, especially when they are wet. The resultant problems are obvious, and those involved in the tray art have searched for many years for a way of providing a non-slip surface on the trays.

One approach has been to glue a thin, textured rubber mat over the surface of the tray, using a suitable rubber adhesive. These trays do provide improved non-slip performance, but they suffer from several serious disadvantages. First, the process for preparing the trays is time-consuming, labor intensive, and expensive. Second, the rubber mat coating or the adhesive may be exposed to solvents which will deteriorate the rubber or the adhesive. For example, salad oil has a tendency to delaminate such rubber mats. Third, such trays require cleaning, and if used in food or drink service applications, they must be sanitized, which means subjecting the trays to high temperatures and/or pressures. Such cleaning will also result in rapid deterioration of the rubber mat.

Abrasive fill coatings can also deteriorate under the aforementioned conditions and are also prone to mechanical abrasion during use, which has a tendency to remove the binder coating over the granular particles, leading eventually to degradation of the non-slip properties of the coated product.

Non-slip properties are desirable in applications other than trays. For example, many boat parts are now prepared from molded, fiberglass-reinforced plastic, and it would be desirable to provide a non-slip surface therefor. Such a finish would reduce the likelihood of a person inadvertently slipping when walking on the piece. Other examples of articles for which a non-slip finish would be desirable are pads for office supplies and bathroom fixtures such as tubs and shower stalls.

A method for preparing long-lasting, non-slip surfaces which is economical and fast and which produces products of improved quality would represent a substantial advance in the art.

As used herein, the term "non-slip" surface means a surface upon which articles placed will be prevented from or will have a reduced tendency for sliding.

OBJECTS AND SUMMARY OF THE INVENTION

It is a principal object of the present invention to provide novel, non-slip coatings for articles which overcome the above-noted disadvantages of prior art coatings.

Another object of the present invention is to provide a novel method for applying non-slip coatings to molded articles which represents an improvement over the laminating or spraying methods of the prior art.

Yet another object of the present invention is to provide a non-slip surface for molded plastic articles which is permanent and which is not readily attacked by liquid materials to which the articles may be exposed.

A still further object of the present invention is to provide a method for preparing non-slip surfaces for plastic articles which does not utilize granular materials which may become exposed during extended use of the article.

A different object of the present invention is to provide a non-slip surface for molded articles which is not susceptible to delamination.

How these and other objects of the invention are accomplished will now be described by reference to the following detailed description of the preferred embodiment of the invention, taken in conjunction with the drawings. Generally, however, the objects are accomplished by providing a sheet of material, such as paper or cloth, which is impregnated with a liquid latex material. The preferred latex is an acrylic latex. The liquid impregnated sheet is preferably molded onto a thermosetting resin matrix during a molding operation. The resin matrix may be any typical matrix, such as one prepared from an unsaturated polyester, epoxy or urethane system. The resin matrix may or may not be reinforced by materials such as glass, polyester or nylon fibers. While release coatings may be employed between the surface of the impregnated carrier sheet and the surface of the mold most nearly adjacent thereto, the impregnated carrier should be located as the outermost part of the molded product system to insure the highest amount of non-slip properties for the final product. Other ways in which the objects of the invention are accomplished will become apparent to those skilled in the art after reading the following description of the preferred embodiment.

DETAILED DESCRIPTION OF THE PREFERRED EMBODIMENT

Figure 1:
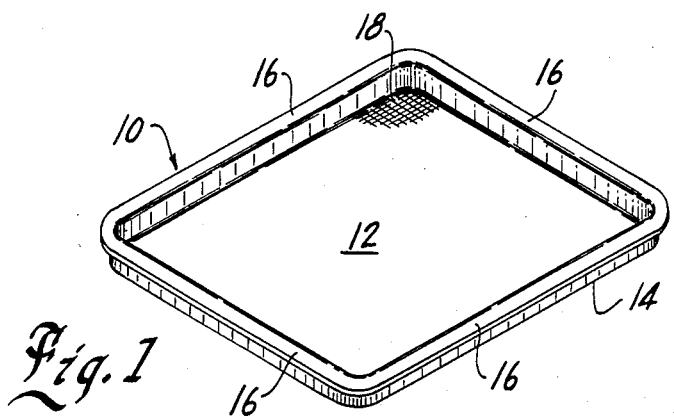
FIG. 1 is a perspective view of a tray embodying the features of the present invention, with the molded non-slip carrier sheet shown in phantom for purposes of illustration.

FIG. 1 shows a tray 10, such as a cafeteria tray, embodying the non-slip features of the present invention. Tray 10 includes a top planar surface 12, a bottom planer surface 14, and a lip 16, and is of a generally well-known configuration. Shown in phantom in FIG. 1 is a non-slip surface 18 which covers practically the entire area of top surface 12. While the area of coverage of non-slip surface 18 is not critical to the present invention, for this particular application it is most desirable to cover as much of top surface 12 as possible. The reason, obviously, is to provide the benefits of the present invention to as large an area as possible, so that articles placed on the tray will be prevented from slipping as the tray is lifted from a first surface by the user, carried to another location, and lowered to a second surface.

Figure 2:
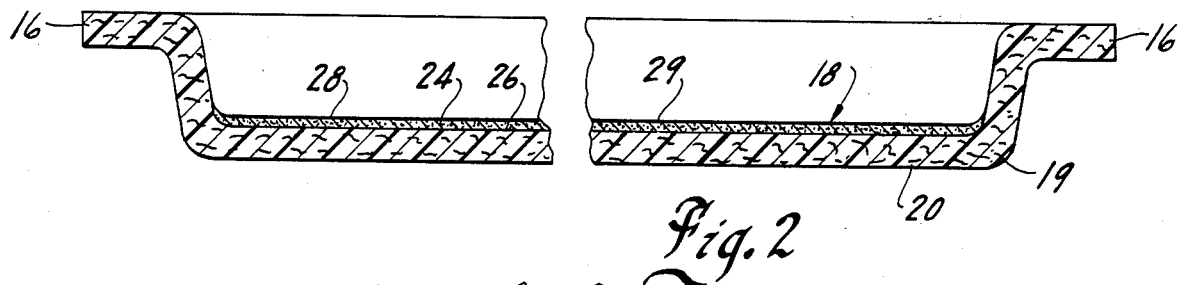
FIG. 2 is a vertical cross-section through the tray of FIG. 1, showing the base resin matrix, the latex embedded carrier sheet, and a thin release coating, the thickness of the various layers not being to scale.

A cross-section of tray 10 is shown in FIG. 2, from which it can be seen that the tray is comprised of fiberglass reinforced thermoset plastic 19, the fiberglass reinforcing fibers being shown at 20. The non-slip portion 18 is shown more clearly in this FIGURE to include a layer 24 at the top of tray 10. Layer 24 is comprised of a material selected from a sheet material such as cloth (woven or non-woven) or paper 26 which is impregnated prior to the preparation of tray 10 with a latex 28. As shown in this FIGURE, a very thin amount of a release coating 30 may be located over layer 24.

The major components of the tray then include a thermoset plastic 19 and the impregnated non-slip layer 24. The plastic may be selected from any known type of thermoset material such as unsaturated polyesters, epoxies or urethanes. More specifically, the plastic 19 may include unsaturated polyesters such as those prepared from the reaction product of acids and glycols dissolved in a suitable vinyl monomer. Typical examples of the various components of such polyester resins are: unsaturated acids and/or anhydrides such as maleic, fumaric, itaconic; saturated acids and/or anhydrides such as phthalic, isophthalic, terephthalic, tetrahydrophthalic, chlorendic, adipic, sebacic; glycols, such as ethylene glycol, propylene glycol, diethylene glycol, dipropylene glycol, neopentyl glycol, dibromoneopentyl glycol; vinyl monomers such as styrene, vinyl toluene, chlorostyrene, bromostyrene, methyl methacrylate, ethylene glycol dimethacrylate. Other resins which could be used which are similar to polyesters are the so called vinylesters made by the reaction of acrylic or methacrylic acid with poly epoxides. These are likewise typically dissolved in a vinyl type monomer, such as strene, or other monomer as aforementioned.

Epoxies are prepared by the reaction of epichlorohydrin with a hydroxy containing compound. The hydroxy compound may be phenolic or glycol in character. Epoxies can also be prepared by the reaction of peracetic acid and an unsaturated component. The usual materials of commerce have two or more oxirane rings per molecule.

Urethanes are prepared by the reaction of a polyisocyanate with a polyhydric compound. Examples of commonly used isocyanates are toluene diisocyanate, methylene dianiline diisocyanate, polymeric methylene dianiline diisocyanate, isophorone diisocyanate and others. Polyhydric compounds are typically those prepared from propylene oxide and ethylene oxide or combinations of propylene oxide and ethylene oxide and polyesters having terminal hydroxyl groups. Oxirane adducts of glycerine, trimethylol propane, sorbitol, sucrose and other hydroxyl compounds are common polyols of commerce. These systems are illustrative rather than limiting.

The sheet 26 to be impregnated has a preferred thickness of about 2 mils (although the thickness is not particularly critical), and the impregnated sheet has a preferred thickness of about 5–7 mils. Impregnation can be carried out by any suitable technique, such as spraying, dipping, brushing, rod coating, etc.

Before proceeding to a description of the latex impregnation material, it should be pointed out here that the non-slip characteristics can be imparted to the molded article by simply applying a coating of the latex directly on the article and allowing the coating to air dry. It is preferred, however, to use the impregnated sheet 24 because the size of the non-slip area can be controlled and because the non-slip characteristics can be enhanced using this technique.

While a number of latex materials 28 can be employed in the present invention, the preferred material are latexes sold under the trademarks Hycar 1577, 2679 and 26120 by the B.F. Goodrich Company. The first two of these materials are described as acrylonitrile - butadiene styrene materials while the latter is described as an acrylic latex. Other latex materials which can also be used as impregnating material 28 include other acrylic, vinyl acrylic, modified acrylic and vinyl chloride latex systems sold under the Ucar trademark by Union Carbide Corporation, such as Ucar 4550, 376, 416 and Union Carbide's Geon 476 and 460×45 latexes. The only latex system which did not show some substantial improvement over an untreated surface blank was a straight vinyl acetate latex. A more simple vinyl acrylic latex known as Ucar Latex 367 showed improvement in anti-skid properties, but not as large an improvement as some of the other materials.

The principle by which the addition of a latex layer to a molded thermoset plastic article imparts non-slip characteristics thereto is not fully understood, but it is believed that some degree of cross-linking takes place between the resin 19 and the latex layer 24. This is an especially likely explanation when the resin 19 is a polyester containing some degree of unsaturation.

Figure 3:
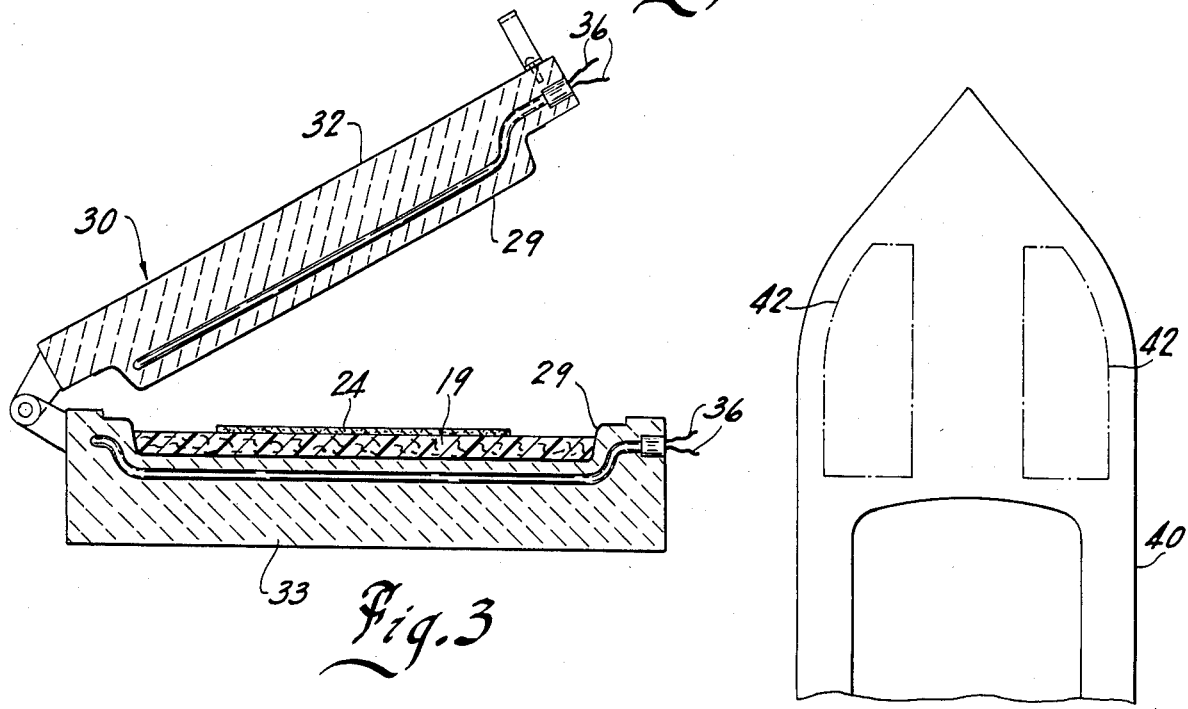
FIG. 3 is a schematic illustration of a plastic molding machine into which the resin matrix and impregnated carrier sheet have been placed for thermoset molding.

The technique for preparing tray 10 is illustrated in FIG. 3 where a portion of a molding machine 30 is shown to include top and bottom halves 32 and 33, respectively. Plastic 19 is added to bottom half 33 and layer 24 (in this case an impregnated sheet) is placed over the top of plastic 19. While not shown in this FIGURE, the inside of the top half 32 may be coated with a thin layer of a mold release agent as is generally known to the art. The bottom half 33 is also typically so coated before plastic 19 is added thereto.

Mold halves 32 and 33 are heated, as illustrated by lead wires 36, to a temperature sufficient to cure the thermoset plastic 19 and to bond layer 24 thereto. The mold halves are closed for a time sufficient to mold tray 10 and accomplish the cure. The mold is then opened to permit removal of tray 10.

Table 1 which is set out below illustrates test results where seven mil wet films of various latexes were applied to a tray. The films were then baked for one-half hour at 75° C. and evaluated for non-slip properties by placing a four ounce glass bottle containing sufficient liquid to have a total weight of 250 grams on the film.

One end of the tray was raised until the bottle slid or tipped. The larger the height of the slant, the larger the improvement in non-slip properties.

TABLE 1

| Coating | Height of Slant |
| --- | --- |
| BLANK | 2.5 |
| UCAR LATEX 130 | 2.75 |
| UCAR LATEX 367 | 3.0–3.25 |
| UCAR VEHICLES 4550 | 6.0 |
| UCAR LATEX 376 | 6.5 |
| UCAR ACRYLIC 516 | 6.5 |
| GEON 576 | 6.5 |
| GEON 460 × 46 | 6.5 |
| HYCAR 157 | 6.5–7.0 TIPPED |
| HYCAR 2679 | 6.5–7.0 TIPPED |
| HYCAR 26120 | 6.5–7.0 TIPPED |

Figure 4:
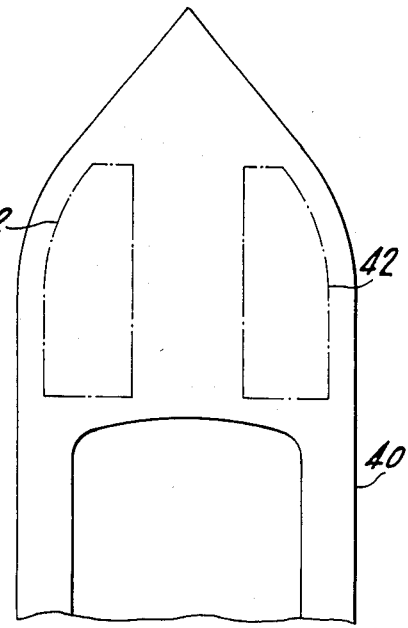
FIG. 4 is a perspective view of another article, a boat deck, showing the use of the present invention for articles other than trays, the non-slip carrier sheets again being shown in phantom for purposes of illustration.

Another molded article 40 is illustrated in FIG. 4, i.e., a boat deck. Two non-slip surfaces 42 are shown in phantom in this FIGURE and would be added in the same manner as was employed for the production of tray 10. As heretofore mentioned, any number of other products prepared from thermoset plastic can have a non-slip finish applied thereto using the same techniques. Numerous applications would be recognized by those skilled in the art after the present specification has been read and understood.

The products prepared according to the teachings of the present invention show improved properties when tested for staining, exposure to hot oils, abrasion, peel and friction testing, testing with hot and cold temperatures, detergents, etc. The improvements were noted when compared to trays prepared from similar plastics without the latex layer 24.

While the present invention has been described by reference to a preferred and one alternate embodiment, it is not to be limited thereto, but is to be limited solely by the scope of the claims which follow.

We claim:

1. A molded thermoset plastic article comprising a body portion and a non-slip portion on a surface of said body portion, said non-slip portion comprising a layer of latex applied to said surface before the cure of said thermoset plastic article, said latex and said thermoset plastic at least some residual unstaturation prior to curing.

2. The invention set forth in claim 1 wherein said layer comprises a sheet material impregnated with said latex.

3. The invention set forth in claim 2 wherein said sheet material is a material selected from the group consisting of woven cloth, non-woven cloth, and paper.

4. The invention set forth in claim 1 wherein said latex is an acrylic latex.

5. A tray having a generally planar surface for carrying articles, said tray comprising a body portion of a thermoset plastic and a non-slip portion covering at least part of said surface, said non-slip portion comprising a layer of latex applied to said surface before the cure of said thermoset plastic, said latex and said thermoset plastic having included at least some residual unsaturation prior to curing.

6. The invention set forth in claim 5 wherein said plastic is reinforced.

7. The invention set forth in claim 5 wherein said layer comprises a sheet material impregnated with said latex.

8. The invention set forth in claim 5 wherein said sheet material is a material selected from the group consisting of woven cloth, non-woven cloth, and paper.

9. A method for preparing a plastic article having a non-slip surface wherein said plastic article comprises a body portion of cured thermoset resin, said method comprising the steps of placing uncured thermoset plastic into a mold, applying a layer of latex to the uncured plastic within said mold, and curing said thermoset plastic and said latex layer, said latex and said thermoset plastic having included at least some residual unsaturation prior to curing.

10. The invention set forth in claim 9 wherein said layer of latex comprises a sheet material impregnated with said latex.

11. The invention set forth in claim 10 wherein said sheet material is a material selected from the group consisting of woven cloth, non-woven cloth, and paper.

12. The invention set forth in claim 9 wherein said latex comprises an acrylic latex.

13. The invention set forth in claim 9 wherein said thermoset plastic is reinforced.

* * * * *